United States Patent
Grechishkin et al.

(10) Patent No.: US 11,868,382 B1
(45) Date of Patent: Jan. 9, 2024

(54) SOFTWARE UTILITY TOOLBOX FOR CLIENT DEVICES

(71) Applicant: Parallels International GmbH, Schaffhausen (CH)

(72) Inventors: Alexander Grechishkin, Moscow (RU); Alexandr Sursiakov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 1224 days.

(21) Appl. No.: 15/343,082

(22) Filed: Nov. 3, 2016

(51) Int. Cl.
| | |
|---|---|
| *G06F 16/00* | (2019.01) |
| *G06F 16/33* | (2019.01) |
| *G06F 16/25* | (2019.01) |
| *G06F 16/2452* | (2019.01) |
| *G06F 40/205* | (2020.01) |
| *G06F 3/0486* | (2013.01) |
| *G06F 3/0482* | (2013.01) |

(52) U.S. Cl.
CPC .... *G06F 16/3344* (2019.01); *G06F 16/24522* (2019.01); *G06F 16/25* (2019.01); *G06F 40/205* (2020.01); *G06F 3/0482* (2013.01); *G06F 3/0486* (2013.01)

(58) Field of Classification Search
CPC ................................................ G06F 17/30684
USPC ...................................................... 707/755
See application file for complete search history.

(56) References Cited

U.S. PATENT DOCUMENTS

| | | | | |
|---|---|---|---|---|
| 8,731,902 | B2* | 5/2014 | Beld | G06F 40/20 704/9 |
| 9,298,851 | B2* | 3/2016 | Nierenberg | G06F 16/3329 |
| 9,329,755 | B2* | 5/2016 | Patel | G06Q 30/0251 |
| 10,324,987 | B2* | 6/2019 | Patil | G06F 16/9535 |
| 10,366,127 | B2* | 7/2019 | Delli Santi | G06F 16/235 |
| 10,885,130 | B1* | 1/2021 | Abdulhayoglu | G06F 16/953 |
| 2003/0182391 | A1* | 9/2003 | Leber | G06F 16/951 709/217 |
| 2004/0158811 | A1* | 8/2004 | Guthrie | G06F 8/20 717/103 |
| 2004/0205200 | A1* | 10/2004 | Kothari | G06F 8/20 709/229 |
| 2010/0257479 | A1* | 10/2010 | Do | G06F 9/453 715/780 |
| 2012/0198369 | A1* | 8/2012 | Sorin | G06Q 10/10 715/763 |

* cited by examiner

*Primary Examiner* — Debbie M Le
(74) *Attorney, Agent, or Firm* — Rosenberg, Klein & Lee (57) ABSTRACT

A toolbox application presents a user interface on a client device, and receives a natural language search query provided by a user of the client device that identifies a desired functionality to be performed for the user. The toolbox application determines whether any of a plurality of accessible utility components accessible is capable of performing the desired functionality specified in the search query. Responsive to determining that none of the accessible utility components is capable of performing the desired functionality, the toolbox application sends a request comprising the natural language search query to a server that maintains library of a plurality of utility components.

28 Claims, 7 Drawing Sheets

SOFTWARE UTILITY TOOLBOX FOR CLIENT DEVICES

TECHNICAL FIELD

Embodiments of this disclosure relate generally to computer systems and, more specifically, relate to management of software utility applications on client devices in computer systems.

BACKGROUND

An application program is a computer program that performs a particular utility, task, function, or group of utilities, tasks, or functions for a user of the computer. An application program can perform functions such as word processing, spreadsheet computation, web browsing, file editing, media playback, file management, or the like. An application program may also communicate with the operating system of a computer to perform utility functions to control the computer. Application programs may be bundled with an operating system, may be developed as commercial products by third parties, or may be open source. In some cases, an application program may be a part of an application suite, which contains several large applications bundled together as one product.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Described herein are methods and systems for enabling and implementing a software utility toolbox for client devices. Application programs can perform a particular utility, task, function, or group of utilities, tasks, or functions for a user of the computer. Application programs may be bundled with an operating system, may be developed as commercial products by third parties, or may be open source. In some cases, an application program may be a part of an application suite, which contains several large applications bundled together as one product. While many multi-function application programs can perform a variety of different sets of utilities, tasks, or functions, often a user may want to perform a very specific desired functionality. Additionally, some application programs, because of their size and complexity, can be cost prohibitive for a user to purchase when they may only need to use a small number of the functions that the application programs provide. Moreover, while a user may know the desired functionality that they wish an application to perform, they may not be aware of any applications that are capable of performing that desired functionality. As such, a basic search engine query for the desired functionality may not provide results that include an application capable of providing that desired functionality.

Aspects of the present disclosure address the above noted and other deficiencies by providing a toolbox on a client device to curate and manage a library of software utilities to perform specific functionalities desired by the user of the client device. In one embodiment, a software utility toolbox application presents a user interface on a client device, and receives a natural language search query provided by a user of the client device that identifies a desired functionality to be performed for the user. The toolbox application determines whether any of a plurality of accessible utility components is capable of performing the desired functionality specified in the search query. Responsive to determining that none of the accessible utility components is capable of performing the desired functionality, the toolbox application sends a request comprising the natural language search query to a server that maintains library of a plurality of utility components. The server, upon receiving the request, can determine whether any of the utility components in the library is capable of performing the desired functionality, and if so, cause that utility component to be accessible to the toolbox application for execution.

Aspects of the present disclosure are thus capable of providing utility components that are capable of performing desired functionalities for a user without requiring the user to purchase or download multi-function third party applications that involve more functionality than the user needs. The toolbox application can curate and download low weight utility components that perform specific functionalities and maintain them in a single library on the client device, which can improve the efficiency of a user's interaction with a client device to perform particular tasks, as well as improve the organization of the client device since the utility components are in a single place on the device.

Figure 1:
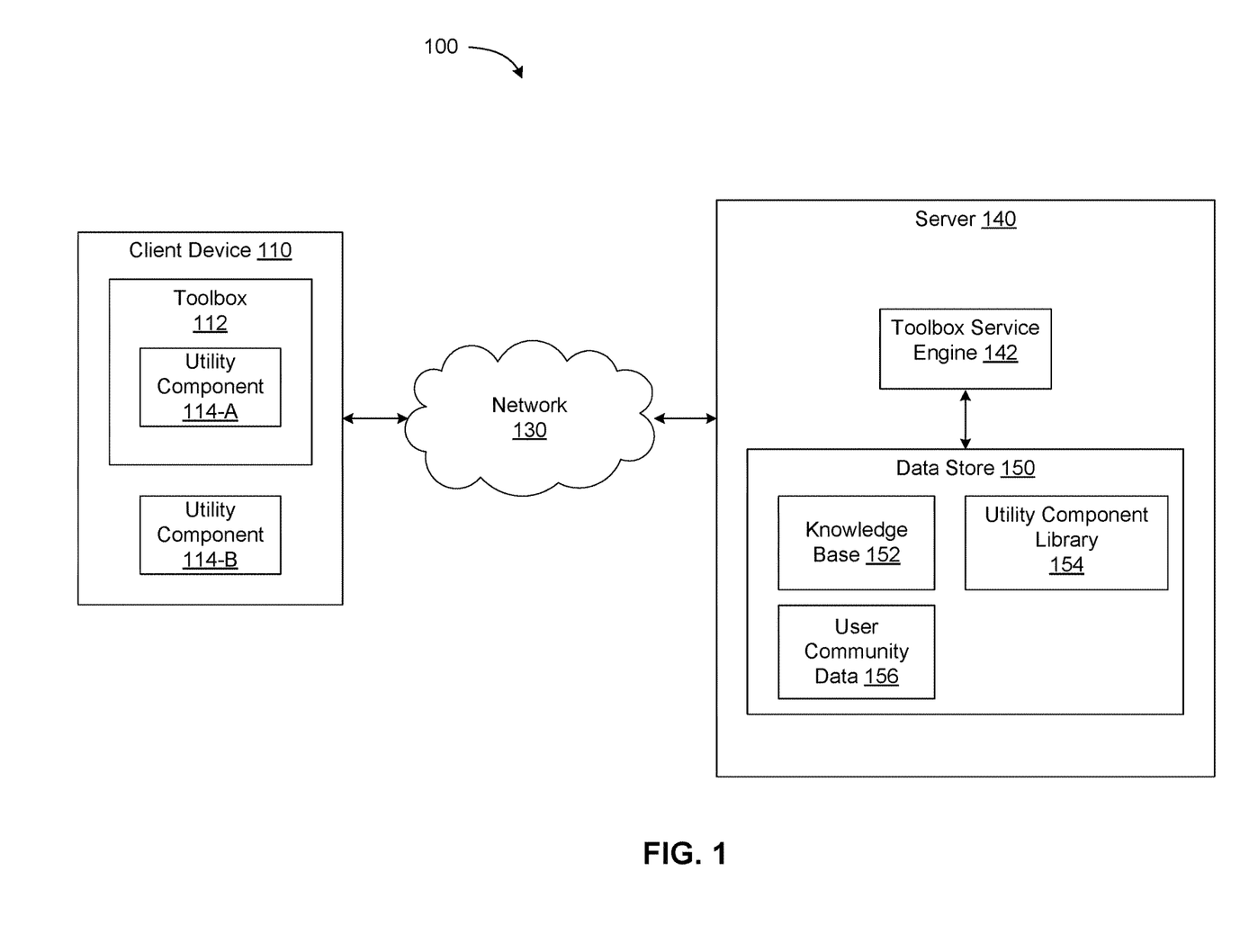
FIG. 1 is a block diagram illustrating a networked environment in which embodiments of the present disclosure may be implemented.

FIG. 1 is a block diagram illustrating a networked environment 100 in which embodiments of the present disclosure may be implemented. The networked environment 100 can include one or more client devices 110 and one or more servers 140, which are in data communication with each other via network 130. Computer system 700 illustrated in FIG. 7 may be one example of any of client devices 110 or servers 140. The network 130 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Client devices 110 may include processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, client device 110 includes a toolbox 112, utility component 114-A, and utility component 114-B.

Toolbox 112 may manage the installation, configuration, and or execution of one or more utility components 114-A and/or 114-B. In some implementations, toolbox 112 may be a software application that can be installed on client device 110, and invoked by a user. Toolbox 112 may execute utility components already stored on client device 110 to perform a desired functionality for the user, or communicate with server 140 to determine if there are any utility components available on the server 140 that can perform the desired functionality for the user. The user may then interact with the toolbox 112 via a graphical user interface to install, configure, and execute one or more of utility components 114-A, 114-B.

Utility components 114-A, 114-B may be software applications or application modules that each serve a specific need of the user. Utility components 114-A, 114-B can include executable applications, workflow scripts that invoke other applications, reference links that can execute functions provided by an operating system of the client device 110, reference links that can initiate execution of a utility component stored on server 140, or the like. In some implementations, utility component 114-A may be downloaded from server 140 to perform a desired functionality for the user that is not already provided by the operating system of client device 110. For example, a user may seek to compress an image and attach the image to an email. If this desired functionality is not already present on client device 110, toolbox 112 can allow the user to download a utility component to provide that functionality as described below.

In some implementations, utility component 114-B may be an application or component of the operating system of client device 110 that can be invoked by Toolbox 112 to perform the desired functionality for the user. For example, the user may seek to generate a screenshot image of what is being displayed by client device 110. Rather than download a new utility component to perform this functionality, Toolbox 112 may invoke utility component 114-B of the client device to perform this functionality. It should be noted that while for simplicity only a single utility component 114-A and 114-B are depicted, multiple utility components 114-A and 114-B may be stored on client device 110.

In an illustrative example, Toolbox 112 can present a user interface on client device 110. The user may use the user interface to enter a natural language search query identifying a desired functionality to be performed for the user. The desired functionality may be one of those described above. The desired functionality may also be any other functionality that the user would like to perform on the client device 110. For example, in addition to those mentioned above, the desired functionality may be compressing a file or image, encrypting a file, sending a file to a recipient via email, text message, etc., or any other type of functionality capable of being performed by a utility component executed by client device 110. For example, a user may enter a natural language search query such as "compressing, encrypting, and sending a file" that identifies these desired functionalities.

Toolbox 112 may then receive the natural language search query and determine whether any of the utility components (e.g., 114-A, 114-B) accessible to toolbox 112 is capable of performing the desired functionality specified in the search query. In some implementations, toolbox 112 may make this determination by parsing the natural language search query, performing a linguistic analysis on the parsed query to identify keywords in the query, and accessing a knowledge base on the client device that stores information associating keywords with utility components accessible to toolbox 112.

Responsive to determining that one of the utility components (e.g., 114-A, 114-B) accessible to toolbox 112 is capable of performing the desired functionality, toolbox 112 may then execute that utility component to perform the desired functionality. If the identified utility component is stored locally on client device 110, toolbox 112 may initiate local execution of the utility component on device 110. If the identified utility component is configured to execute remotely, toolbox 112 may send a request to toolbox service engine 112 of server 140 to initiate remote execution of the identified utility component.

Responsive to determining that none of the utility components (e.g., 114-A, 114-B) accessible to toolbox 112 is capable of performing the desired functionality, toolbox 112 may send a request to toolbox service engine 112 of server 140 for a component that performs the desired functionality. In some implementations, the request sent to server 140 can include the natural language search query entered by the user in the user interface of toolbox 112. Alternatively, the request may include the keywords identified by toolbox 112 after parsing the natural language search query.

In some implementations, toolbox 112 may facilitate creating a new utility component by combining utility components already accessible to toolbox 112. For example, a user may wish to compress a file, encrypt that file, and send the compressed and encrypted file to an email recipient. If toolbox 112 already has three utility components that perform these three desired functionalities individually, toolbox 112 may combine the three utility components to create a combined utility component. Toolbox 112 may also be configured to execute one or more of utility components 114-A, 114-B based on detected input actions. For example, if a user drags a document to the displayed user interface window of toolbox 112, toolbox 112 may invoke one of utility components 114-A, 114-B. Toolbox 112 may also send a new utility component developed by a user to server 140 so that it may be shared with other users associated with toolbox service engine 142 of server 140. Toolbox 112 is described in further detail below with respect to FIG. 2.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

In some implementations, server 140 can include a toolbox service engine 142 and a data store 150. Toolbox service engine 142 can communicate with toolbox 112 of client device 110 to provide utility components capable of performing desired functionality for a user. In some implementations, toolbox 112 may send requests to toolbox service engine 142 if toolbox 112 is unable to identify a suitable utility component (e.g., where toolbox 112 performs as a "smart client" having access to a knowledge base local to client device 110 as described above). Alternatively, toolbox 112 may send all requests to toolbox service (e.g., where toolbox 112 performs as a "thin client" without local access to a knowledge base). In this implementation, toolbox service engine 142 can perform the analysis of any natural language search query entered by the user and subsequent identification of a utility component.

In some implementations, server 140 can include a data store 150 which may store knowledge base 152, utility component library 154, user community data 156, and/or other server data. Data store 150 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Knowledge base 152 may be a data structure that stores associations between keywords for desired functionalities and utility components that are capable of performing the desired functionalities. For example, the keyword "compress" may be associated with any known utility component that is capable of performing a compression operation on input data (e.g., a document file, image file, etc.). Knowledge base 152 may also contain resource location information that identifies the location of utility components available for download or remote execution by toolbox 112. For example, if a utility component is stored in utility component library 154 and is available to be downloaded by a client device 110, knowledge base 152 may contain the uniform resource locator (URL) that can facilitate downloading the utility component by toolbox 112 on client device 110. Alternatively, if a utility component is available to be remotely executed by client device 110, knowledge base 152 may contain a URL (or other similar reference information) that can facilitate remote execution of the utility component by toolbox 112.

In some implementations, utility components provided by third party developers and/or software publishers may not be stored locally on server 140, but may instead be stored on a server or storage device of the third party. In such cases, knowledge base 152 may include the URL associated with the location of the utility component on the third party server or storage device.

Toolbox service engine 142 can maintain multiple utility components available for download or remote execution, storing them in utility component library 154. Utility component library 154 can include executable code, source code that can later be assembled or compiled into executable code, workflows, scripts, reference links (e.g., aliases) to operating system functions, or the like. User community data 156 can include contact information that identifies known users of distributions of toolbox 112, as well as known developers/creators of utility components. The information in user community data 156 can be collected and stored each time a user installs toolbox 112 on the user's device.

In an illustrative example, toolbox service engine 142 can receive a request from toolbox 112 that includes a natural language search query identifying a desired functionality. As noted above, the natural language search query can be provided by a user of client device 110 via the user interface of toolbox 112. Toolbox service engine 142 may then determine whether any of the utility components available in utility component library 154 is capable of performing the desired functionality. In some implementations, toolbox service engine 142 may make this determination by parsing the natural language search query, performing a linguistic analysis on the parsed query to identify keywords in the query, and accessing knowledge base 152.

Responsive to determining that one of the utility components in utility component library 154 is capable of performing the desired functionality specified in the request, toolbox service engine 142 may cause the identified utility component to be accessible to toolbox 112 for execution. In some implementations, the utility component may be downloaded by toolbox 112. Alternatively, the utility component may remain on server 140 and be remotely executed by toolbox 112.

Responsive to determining that none of the utility components in utility component library 154 is capable of performing the desired functionality specified in the request, toolbox service engine prompt the user for functional requirements for the desired functionality. Toolbox 142 may then access user community data 156 to obtain contact information for known developers and send requests to one or more of the known developers to develop a utility component capable of performing the desired functionality. Alternatively, toolbox service engine 142 may automatically build a combined utility component from existing utility components that together are capable of performing each of the functional requirements. For example, if no single utility component available in utility component library 154 is capable of compressing, encrypting, and sending a file, but there are individual utility components that are each capable of performing one of the functionalities, toolbox service engine 142 may create a combined utility component by associating the three utility components with each other. The combined utility component may then be made accessible to toolbox 112. Toolbox service engine 142 is described in further detail below with respect to FIG. 3.

Figure 2:
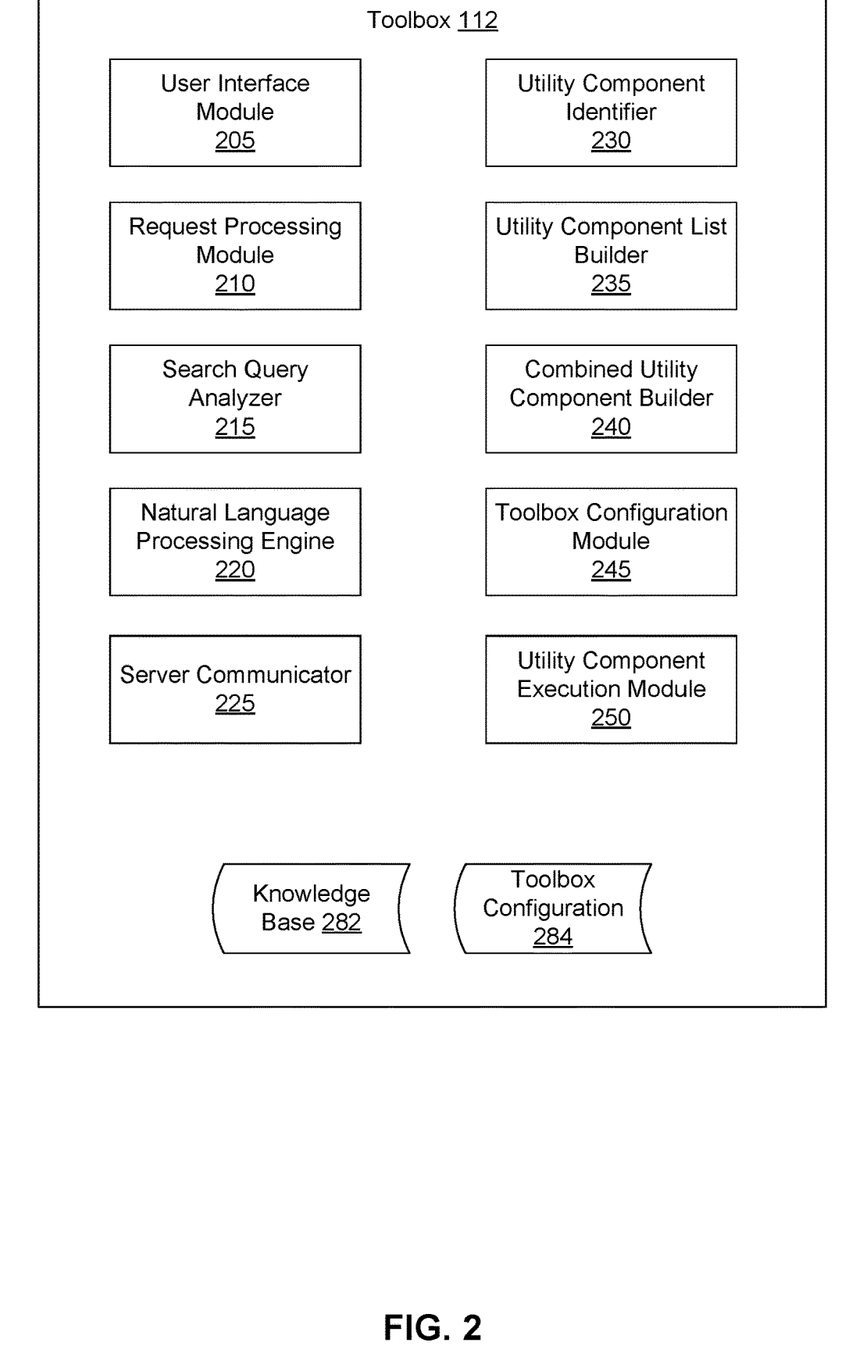
FIG. 2 is a block diagram illustrating a toolbox application, according to an embodiment.

FIG. 2 is a block diagram of one embodiment of a toolbox 112 showing logical modules that may be loaded into and executed by a processing device of client device 110. In one embodiment, toolbox 112 corresponds to toolbox 112 of FIG. 1. In some implementations, toolbox 112 can include user interface module 205, request processing module 210, search query analyzer 215, natural language processing engine 220, server communicator 225, utility component identifier 230, utility component list builder 235, combined utility component builder 240, toolbox configuration module 245, and utility component execution module 250. This arrangement of modules and components may be a logical separation, and in other embodiments, these modules or other components can be combined together or separated in further components.

In an illustrative example, toolbox 112 may invoke user interface module 205 to present a user interface for display by a client device (e.g., client device 110 of FIG. 1). The user interface may be a window, a dialog box, a prompt for textual input, or the like. A user may enter a natural language search query identifying a desired functionality to be performed for the user into an input element of the user interface, which can cause the user interface module 205 to invoke request processing module 210 to process the request and identify a utility component that is capable of performing the desired functionality.

In some implementations where toolbox 112 functions as a "thin client," request processing module 210 may send a request to a server device that maintains a library of utility components so that the server may determine whether any utility components in the library are capable of performing the desired functionality. Request processing module 210 may invoke server communicator 225 to send the request to the server, and if a utility component is identified, receive resource location information that will facilitate downloading or executing the identified utility component.

Alternatively in implementations where toolbox 112 functions as a "smart client," request processing module 210 may first invoke search query analyzer 215 to parse the natural language search query to determine a keyword for the desired functionality specified in the request. To make this determination, search query analyzer can invoke natural language processing engine 220 to perform linguistic analysis on the search query to identify the words in the query, the context of the usage of the words in the query, and the relationship between the words in the query. For example, a natural language search query that states "compressing a file" could determine the keywords of "compress" and "file". Additionally, natural language processing engine 220 can determine that the keyword "file" is being acted upon by an operation associated with the keyword "compress".

Request processing module 210 may then invoke utility component identifier 230 to determine whether any components accessible to the toolbox is capable of performing the desired functionality specified in the search query. A utility component may be accessible to toolbox 112 if it had been downloaded previously in response to a prior request entered by the user. Additionally, a utility component may be accessible to toolbox 112 if a module or component of the operating system of the client device performs the desired functionality. Utility component identifier 230 may access knowledge base 282 on the client device that stores associations between keywords and utility components accessible to toolbox 112, and compare the keywords from the request to keywords in knowledge base 282. If utility component identifier 230 identifies an entry for a utility component in knowledge base 282 that has a matching keyword to that of the request, that utility component should be capable of performing the desired functionality specified in the request. If no match is identified, then it is likely that none of the utility components available to toolbox 112 are capable of performing the desired functionality.

Responsive to determining that one of the utility components accessible to toolbox 112 is capable of performing the desired functionality, request processing module 210 may invoke user interface module 205 to present the identified utility component to the user. For example, user interface module 205 may present a list of identified components that are capable of performing the desired functionality so that the user may select which of the identified utility components to execute. Once selected, request processing module 210 may then invoke utility component execution module 250 to execute the selected utility component.

Responsive to determining that none of the utility components accessible to toolbox 112 is capable of performing the desired functionality, request processing module 210 may invoke server communicator 225 to send a request to a server device that maintains a library of utility components so that the server may determine whether any utility components in the library are capable of performing the desired functionality. Request processing module 210 may invoke server communicator 225 to send the request to the server that includes the natural language search query entered by the user described above.

In some implementations, toolbox 112 may receive resource location information for a utility component from the server device to facilitate downloading of the utility component to the client device. For example, toolbox 112 may receive the URL that identifies the storage location on the server device of the downloadable utility component. Toolbox 112 may then download the identified utility component using the resource location information and store the utility component on the client device so that it is accessible to toolbox 112. In some implementations, request processing module 210 may store an entry in knowledge base 282 that associates the downloaded utility component with one or more keywords from the search query entered by the user. Additionally, the downloaded utility component may be stored on the client device in data store 280 so that it may be accessible to toolbox 112.

In some implementations, toolbox 112 may receive resource location information for a utility component from the server device to facilitate remote execution of the utility component by toolbox 112 of the client device. For example, toolbox 112 may receive the URL that identifies the location on the server device of the executable utility component. Toolbox 112 may then store the resource location utility component on the client device so that it is accessible to toolbox 112. In some implementations, request processing module 210 may store an entry in knowledge base 282 that associates the remote utility component with one or more keywords from the search query entered by the user.

In either case, toolbox configuration 284 may be updated so that the user interface may present the utility component for future use by the user. For example, the newly downloaded or remotely executable utility component may be added to a list of utility components available to toolbox 112 for execution by the user. User interface module 205 may use this information to present the list of available utility components to the user in the user interface. Upon selecting one of the entries in the list, utility component execution module 250 may then execute the selected utility component (either by invoking a locally stored utility component or initiating remote execution of a utility component stored on a server).

In some implementations, toolbox 112 may also create a new utility component that combines two or more utility components already accessible to toolbox 112. A user may enter a natural language search query that specifies more than one desired functionality that may not all be performed by a single utility component. For example, the natural language search query might specify "compress, encrypt, and send a file." Request processing module 210 may parse and analyze the query as described above and utility component identifier 230 may determine that no single utility component is capable of providing the three desired functionalities specified in the request (e.g., compress file, encrypt file, send file). If, however, utility components are identified that perform at least one of the desired functionalities, utility component list builder 235 may be invoked to generate a list of these utility components.

Toolbox 112 may then invoke combined utility component builder 240 to generate a combined utility component using the list. In some implementations, the list may be presented to the user via the user interface so the user may select the components to use. Alternatively, combined utility component builder 240 may select the utility components based on predefined user preferences or information stored in toolbox configuration 284. For example, component "A" may be selected that performs the compress file functionality, component "B" may be selected that performs an encrypt file functionality, and component "C" may be selected that performs a send file functionality.

Combined utility component builder 240 may then generate a combined utility component that associates the selected utility components with each other. Continuing with the above example, combined utility component builder 240 may generate combined utility component "ABC" that associates components A, B, and C with each other. Combined utility component builder 240 may store information in toolbox configuration 284 that specifies that when executing "ABC", the output of "A" may be sent as input to "B", then the output of "B" may be sent as input to "C". The output of "C" in this case represents the output of "ABC".

In some implementations, toolbox 112 may be configured to execute a utility component based on detected input actions by user interface module 205. For example, toolbox 112 may be configured so that when an image file is dragged and dropped into the user interface of toolbox 112, toolbox 112 may execute a utility component that compresses the image to a size suitable to be sent by email, and then sends the compressed image to a particular email recipient. Toolbox 112 may invoke user interface module 205 to prompt a user to enter configuration instructions. The user may select a utility component and associate it with a particular input action. Toolbox configuration module 245 may receive this information and associate the utility component with the selected input action received from the user. The input action can be a toggle-on action (e.g., selecting an input element on the user interface to enable or start a utility component), a toggle-off action (e.g., selecting an input element on the user interface to disable or stop a utility component), a push button action (e.g., selecting an input element on the user interface to execute a utility component a single time), a drag and drop action, or any similar input action capable of being detected by a user interface. Toolbox configuration module 245 may store any received configuration settings in toolbox configuration 284.

Subsequently, toolbox 112 may detect an input action received via user interface module 205. Toolbox 112 may then invoke utility component execution module 250 to initiate execution of the utility component based on the detected input action.

Toolbox 112 may also be configured to share new utility components created by the user with a connected user community. A new utility component may be a combined utility component created by the user using existing utility components as described above, a utility component that is created entirely by the user (e.g., developed or coded from scratch), or the like. Once the new utility component has been created and made accessible to toolbox 112, the user may select an option in the toolbox user interface to upload the new utility component to a server device. Toolbox 112 may initiate server communicator 225 to send the new utility component to the server to be associated with a new desired functionality in a library of utility components on the server (e.g., utility component library 154 of FIG. 1).

Figure 3:
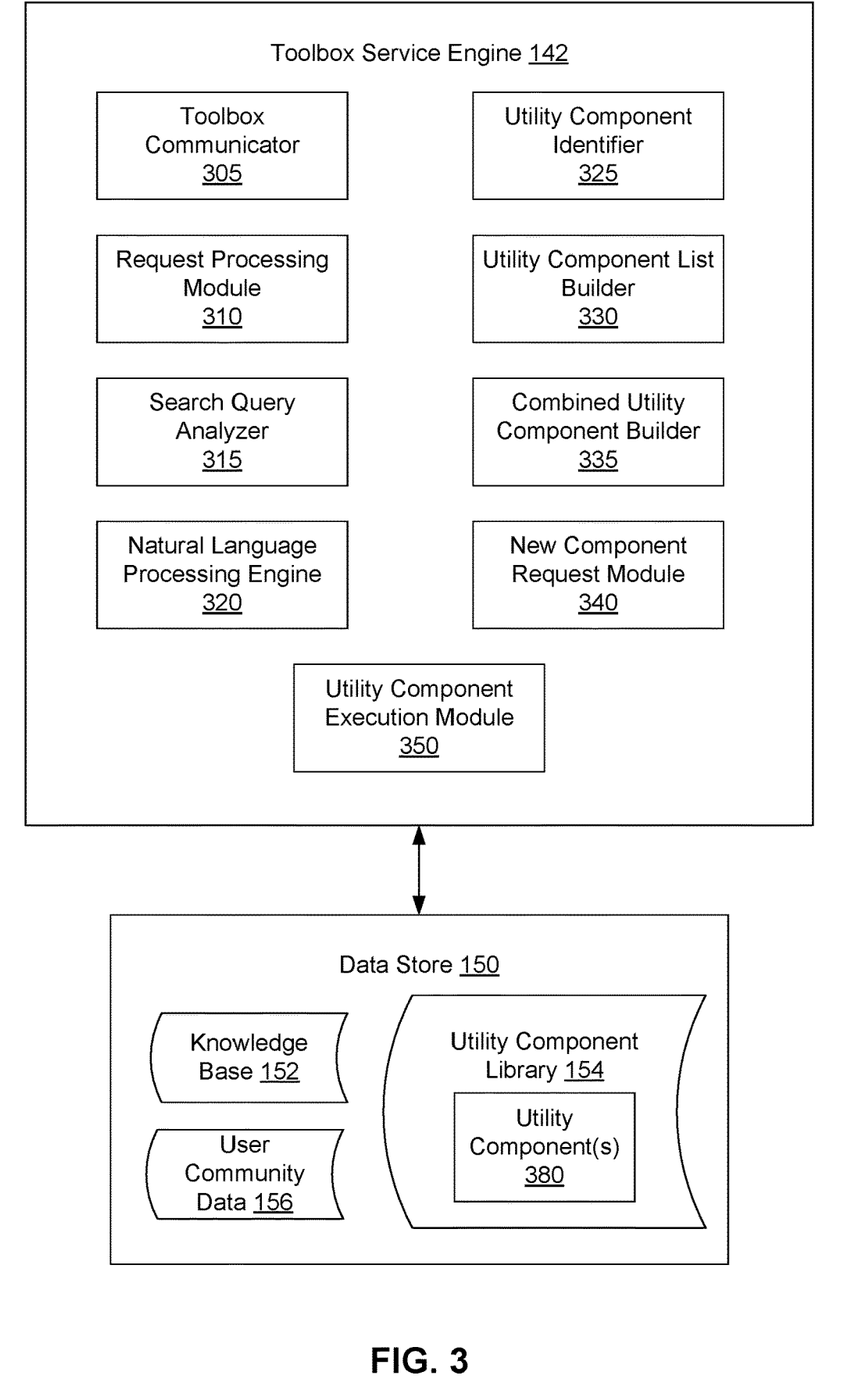
FIG. 3 is a block diagram illustrating a toolbox service engine, according to an embodiment.

FIG. 3 is a block diagram of one embodiment of a toolbox service engine 142 showing logical modules that may be loaded into and executed by a processing device of server device. In one embodiment, toolbox service engine 142 corresponds to toolbox service engine 142 of server 140 of FIG. 1. In some implementations, toolbox service engine 142 can include user toolbox communicator 305, request processing module 310, search query analyzer 315, natural language processing engine 320, server communicator 225, utility component identifier 325, utility component list builder 330, and combined utility component builder 335. This arrangement of modules and components may be a logical separation, and in other embodiments, these modules or other components can be combined together or separated in further components.

In some implementations, data store 150 may be connected to toolbox service engine 142, and can include knowledge base 152, user community data 156, and utility component library 154. In one embodiment, a single server (e.g., server 140 of FIG. 1) may include toolbox service engine 142 and data store 150. In another embodiment, data store 150 may be on a different server from that of toolbox service engine 142, and may be connected over a network or other connection.

In an illustrative example, toolbox service engine 142 may maintain a library of utility components 380, such as utility component library 154 of data store 150. In some implementations, each utility component 380 can perform one or more functionalities, such as those described above with respect to FIGS. 1-2. Utility component library 154 may contain utility components that are stored in data store 150 of toolbox service engine 142, as well as links to third party utility components stored on third party servers. The utility components 380 of utility component library 154 may be made available for download by toolbox applications on client devices (e.g., toolbox 112 of FIGS. 1-2) or may be configured to be executed by toolbox service engine 142 on behalf of a request from a toolbox application to execute the utility component remotely. Remote execution of a utility component may be preferable when the toolbox application is executing as a "thin client" on a client device with minimal resources.

In some implementations, toolbox communicator 305 may be responsible for communicating with a toolbox application on a client device. Toolbox communicator 305 may be configured to communicate using Wi-Fi®, Bluetooth®, Internet Protocol, Ethernet, or in any similar manner. Toolbox communicator 305 may receive a request from a toolbox application on a client device that includes a natural language search query identifying a desired functionality, such as that described above with respect to FIGS. 1-2. The search query may be provided by a user of the client device via a user interface of the toolbox application. As described above with respect to FIG. 2, the search query may be received from the toolbox application if the desired functionality is not available in any utility component already accessible to the toolbox application on the client device.

Responsive to receiving the request, toolbox communicator 305 may invoke request processing module 310 to process the request and determine whether any of the utility components 380 in utility component library 154 is capable of performing the desired functionality specified in the request. Request processing module 310 may first invoke search query analyzer 315 to parse the natural language search query to determine a keyword for the desired functionality specified in the request. To make this determination, search query analyzer 315 can invoke natural language processing engine 320 to perform linguistic analysis on the search query to identify the words in the query, the context of the usage of the words in the query, and the relationship between the words in the query. For example, a natural language search query that states "compressing a file" could determine the keywords of "compress" and "file". Additionally, natural language processing engine 320 can determine that the keyword "file" is being acted upon by an operation associated with the keyword "compress".

Request processing module 310 may then invoke utility component identifier 325 to determine whether any utility components 380 available in utility component library 154 is capable of performing the desired functionality specified in the search query. Utility component identifier 325 may access knowledge base 152 in data store 150 that stores associations between keywords and utility components 380, and compare the keywords from the request to keywords in knowledge base 152. If utility component identifier 325 identifies an entry for a utility component 380 in knowledge base 152 that has a matching keyword to that of the request, that utility component should be capable of performing the desired functionality specified in the request. If no match is identified, then it is likely that none of the utility components 380 in utility component library 154 are capable of performing the desired functionality. If more than one match is identified, utility component identifier 325 may invoke utility component list builder 330 to generate a list of available utility components that are capable of performing the desired functionality so that the list may be returned to the toolbox application, allowing a user to choose a utility component from the list.

Responsive to determining that one of the utility components in utility component library 154 is capable of performing the desired functionality, request processing module 310 cause the identified utility component to be accessible to the toolbox application for execution. In some implementations, request processing module 310 can cause the utility component to be accessible to the toolbox application by sending resource location information for a utility component to the toolbox application to facilitate downloading of the utility component to the client device. For example, request processing module 310 may send the URL that identifies the storage location of the downloadable utility component in utility component library 154. The toolbox application may then download the identified utility component using the resource location information and store the utility component on the client device so that it is accessible.

In some implementations, request processing module 310 can cause the utility component to be accessible to the toolbox application by sending resource location information for a utility component to the toolbox application to facilitate remote execution of the utility component. For example, request processing module 310 may send the URL that identifies the location on the server device of the executable utility component. Request processing module 310 may subsequently receive a request from the toolbox application to execute the utility component, invoke utility component execution module 350 to execute the utility component, and return a response to the toolbox application of the client device with the output of the utility component.

Responsive to determining that none of the utility components 380 in utility component library 154 is capable of performing the desired functionality specified in the request, request processing module 310 may send a prompt to the user interface of the toolbox application on the client device for one or more functional requirements for the desired functionality specified in the request. The functional requirements can be one or more desired functionalities that the user would like a new utility component to perform. For example, if a user is interested in a single utility component that compresses an image file to a particular size (e.g., the maximum size supported by an email client), encrypts the file, then sends the file to a recipient, the functional requirements of the new utility component may be "compress a file to a predetermined size," "encrypt the file using a standard encryption method," and "sending the encrypted file to a list of recipients."

Request processing module 310, upon receiving the functional requirements for the new utility component from the toolbox application, may store the information from the request in knowledge base 152. For example, a record may be created in knowledge base 152 that associates the desired functionality (compress, encrypt, and send a file) with the three individual functional requirements noted above.

In some implementations, request processing module 310 may then invoke new component request module 340 to send a request to a user community associated with the toolbox service engine 142 (e.g., a community of software developers, a community of users/subscribers of the too/box service engine 142, etc.) for a new utility component that performs the desired functionality. New component request module 340 can access user community data 156 to receive a list of users associated with the toolbox engine 142 service. The user community data 156 can include user information that is collected when a user subscribes to the service (e.g., email, phone number, mailing address, etc.). New component request module 340 may then send the request to the list of users that includes the functional requirements received from the toolbox application. The request may be sent by email, text message, via an online chat, printed mail, or in any other manner.

If one of the users in the community develops a new utility component that performs the desired functionality and uploads it to the server, request processing module 310 may be invoked to store the new utility component in utility component library 154. Request processing module 310 may then access knowledge base 152 to identify the request associated with the new desired functionality and send a notification to the requesting user that the new utility component is available for download or remote execution.

In some implementations, rather than send the request to the user community, request processing module 310 may invoke combined utility component builder 335 to generate a combined utility component using existing utility components in utility component library 154. For example, if a single utility component is not available that performs the compress/encrypt/send functionality described above, but there are three individual utility components that each perform one of the three functional requirements of the desired functionality, a combined utility component can be generated using the three individual utility components.

After receiving the functional requirements (compress, encrypt, send), combined utility component builder 335 may determine that a first utility component is capable of performing the first functional requirement, a second utility component is capable of performing the second functional requirement, and a third utility component is capable of performing the third functional requirement. For example, component "A" may be selected that performs the compress file functionality, component "B" may be selected that performs an encrypt file functionality, and component "C" may be selected that performs a send file functionality.

Combined utility component builder 335 may then associate individual utility components with each other to generate the combined utility component, and cause the combined utility component to be accessible to the toolbox application. Continuing with the above example, combined utility component builder 335 may generate combined utility component "ABC" that associates components A, B, and C with each other. Combined utility component builder 335 can configure the component "ABC" such that when executing "ABC", the output of "A" may be sent as input to "B", then the output of "B" may be sent as input to "C". The output of "C" in this case represents the output of "ABC". While this example includes three functional requirements and three individual utility components, in other embodiments combine utility component builder 335 can receive any number of functional requirements and identify any number of individual utility components for generating the combine utility component.

Figure 4:
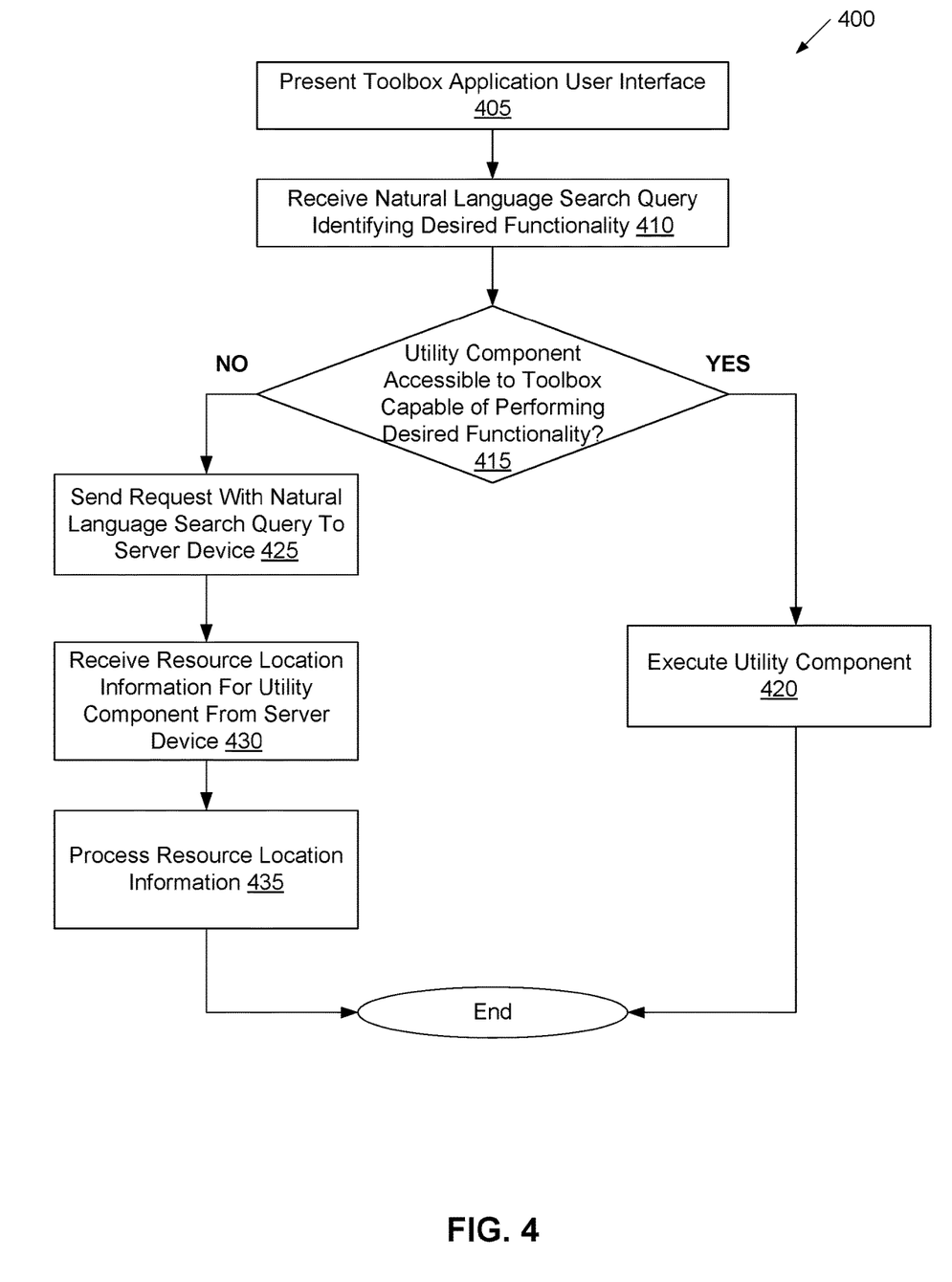
FIG. 4 is a flow diagram illustrating a method of adding a utility component to a toolbox application on a client device, according to an embodiment.
Figure 5:
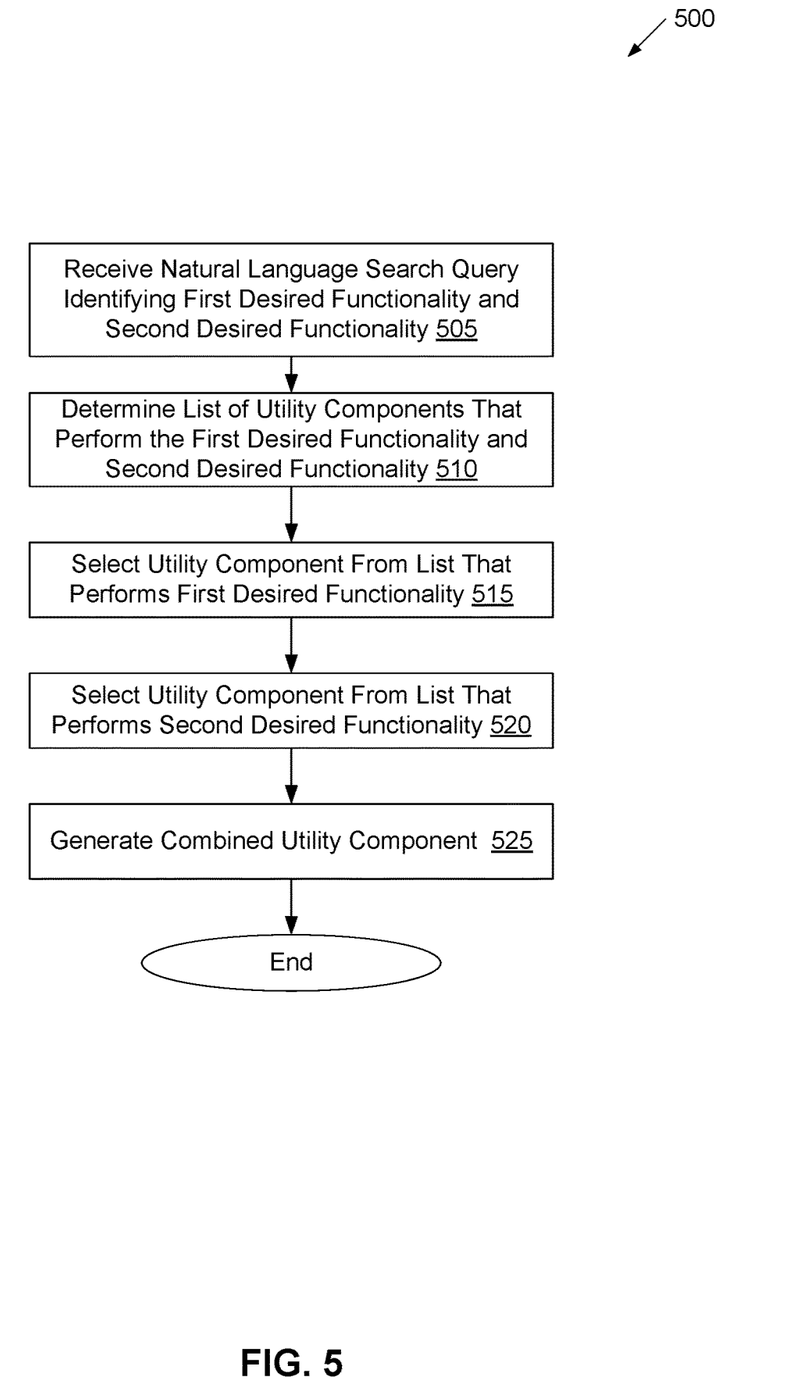
FIG. 5 is a flow diagram illustrating a method of generating a combined utility component by a toolbox application on a client device, according to an embodiment.
Figure 6:
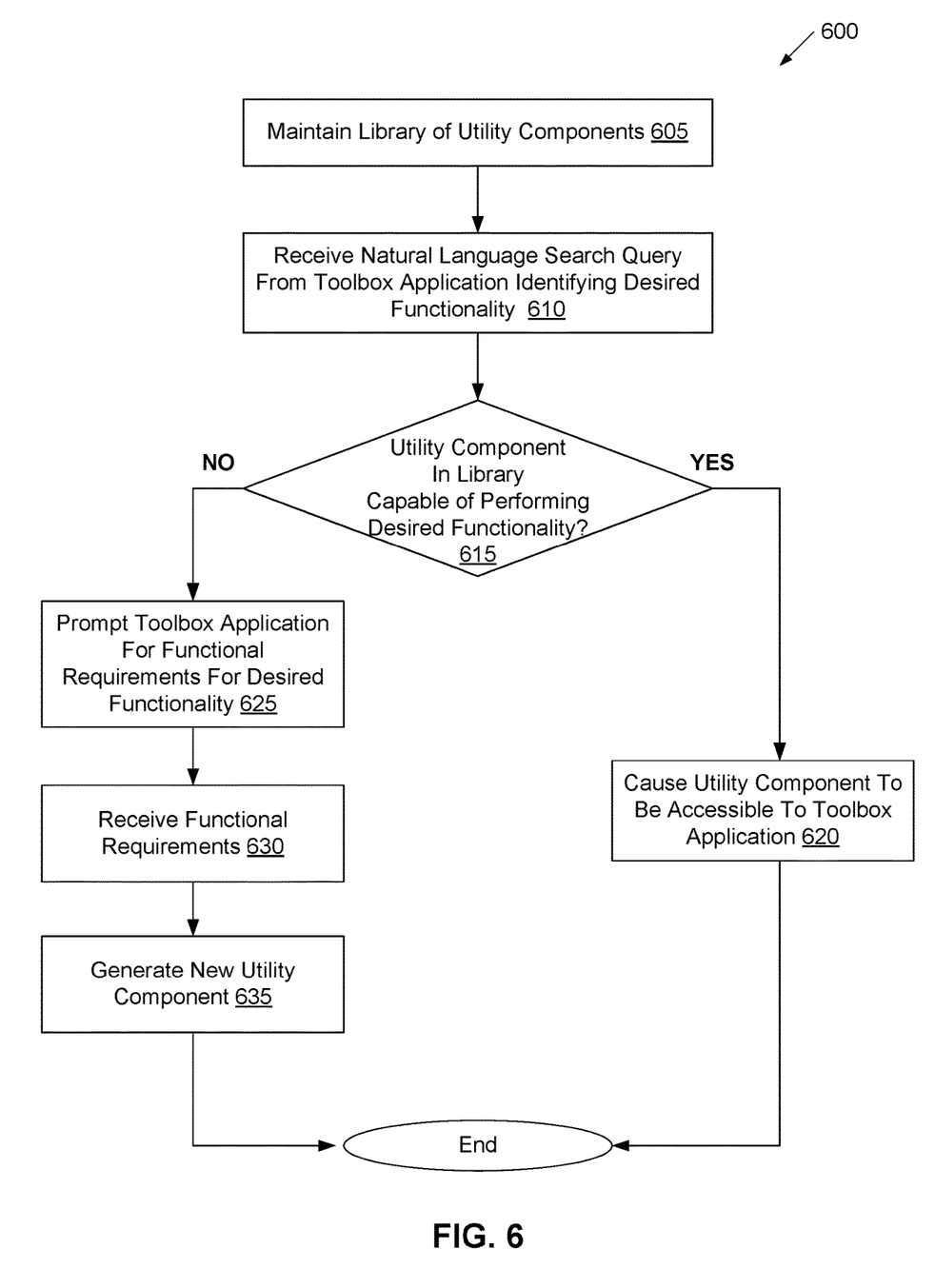
FIG. 6 is a flow diagram illustrating a method of providing utility components to a toolbox application, according to an embodiment.

FIGS. 4-6 are flow diagrams of various implementations of methods related to an application toolbox service. The methods are performed by processing logic that may include hardware (circuitry, dedicated logic, etc.), software (such as is run on a general purpose computer system or a dedicated machine), or a combination of both. Some methods may be performed by an application toolbox of a client device such as toolbox 112 of FIGS. 1-2. Some methods may be performed by a toolbox service engine on a server such as toolbox service engine 142 of FIGS. 1 & 3.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating an embodiment for a method 400 of adding a utility component to a toolbox application on a client device. Method 400 may be performed, for example, by toolbox application. At block 405 of method 400, processing logic presents a user interface by a toolbox application executing on a client device.

At block 410, processing logic receives a natural language search query identifying a desired functionality to be performed for a user of the client device. The search query may be provided by a user of the client device via the user interface of the toolbox application presented at block 405.

At block 415, processing logic determines whether any of a plurality of utility components accessible to the toolbox application for execution is capable of performing the desired functionality specified in the search query. If so, processing continues to block 420. Otherwise, processing proceeds to block 425. In some implementations, processing logic makes the determination by parsing the natural language search query to determine a keyword for the desired functionality specified in the request, accessing a knowledge base on the client device that stores associations between keywords and utility components accessible to the toolbox application, and compares the keyword from the request to the keywords in the knowledge base. At block 420, processing logic executes the utility component identified at block 415 to perform the desired functionality. After block 420, the method of FIG. 4 terminates.

At block 425, processing logic sends a request comprising the natural language search query to a server device. At block 430, processing logic receives resource location information from the server device for a utility component capable of performing the desired functionality. The resource location information may facilitate downloading of the utility component by the toolbox application. Alternatively, the resource location information may facilitate remote execution of the utility component by the toolbox application.

At block 435, processing logic processes the resource location information received at block 430. If the resource location information facilitates downloading of the utility component, processing logic may download the utility component using the resource location information and store the utility component on the client device so that it is accessible by the toolbox application. If the resource location information facilitates remote execution of the utility component, processing logic may store the resource location information so the utility component is accessible to the toolbox application. After block 435, the method of FIG. 4 terminates.

FIG. 5 is a flow diagram illustrating an embodiment for a method 500 of generating a combined utility component by a toolbox application on a client device. Method 500 may be performed, for example, by an application toolbox. At block 505 of method 400, processing logic receives a natural language search query identifying a first desired functionality and a second desired functionality.

At block 510, processing logic determines a list of utility components that perform the first desired functionality and the second desired functionality. At block 515, processing logic selects a utility component from the list determined at block 510 that performs the first functionality. At block 520, processing logic selects a utility component from the list determined at block 510 that performs the second functionality. At block 525, processing logic generates a combined utility component that associates the utility component selected at block 515 with the utility component selected at block 520. After block 525, the method of FIG. 5 terminates.

FIG. 6 is a flow diagram illustrating an embodiment for a method 600 of providing utility components to a toolbox application. Method 600 may be performed, for example, by a toolbox service engine. At block 605 of method 600, processing logic maintains a library of utility components. At block 610, processing logic receives a natural language search query from a toolbox application on a client device identifying a desired functionality.

At block 615, processing logic processing logic determines whether any of a plurality of utility components in the library of utility components is capable of performing the desired functionality specified in the search query. If so, processing continues to block 620. Otherwise, processing proceeds to block 625. In some implementations, processing logic makes the determination by parsing the natural language search query to determine a keyword for the desired functionality specified in the request, accessing a knowledge base that stores associations between keywords and utility components accessible to the toolbox application, and compares the keyword from the request to the keywords in the knowledge base.

At block 620, processing logic causes the utility component identified at block 615 to be accessible to the toolbox application. Processing logic may cause the utility component to be accessible by sending resource location information for the utility component to facilitate downloading the utility component by the toolbox application. Alternatively, processing logic may cause the utility component to be accessible by sending resource location information for the utility component to facilitate remote execution the utility component by the toolbox application. After block 620, the method of FIG. 6 terminates.

At block 625, processing logic prompts the toolbox application for functional requirements for the desired functionality.

At block 630, processing logic receives the functional requirements for the desired functionality.

At block 635, processing logic generates a new utility component using the functional requirements received at block 630. In one embodiment, processing logic may send a request to a user community to generate the new utility component. Processing logic may receive a list of users associated with a server device and send a request to the list of users for a new utility component capable of performing the desired functionality, where the request includes the functional requirements received at block 630.

In another embodiment, processing logic can generate a new utility component by combining existing utility components. Processing logic may determine that a first utility component is capable of performing a first functional requirement received at block 630, and that a second utility component is capable of performing a second functional requirement received at block 630. Processing logic may then associate the first utility component with the second utility component to generate a combined utility component. Processing logic may the cause the combined utility component to be accessible to the toolbox application for execution. After block 635, the method of FIG. 6 terminates.

Figure 7:
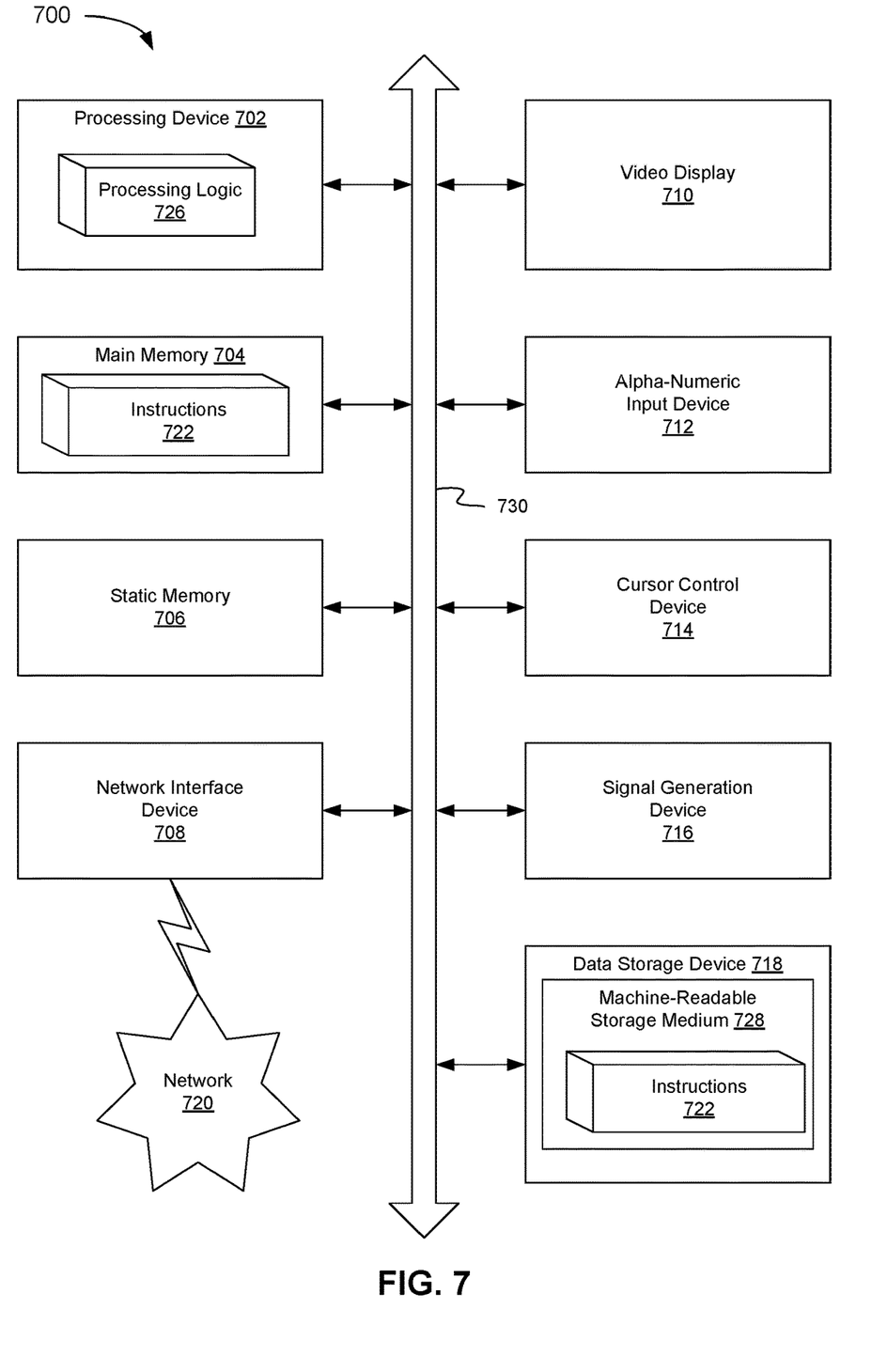
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. For example, the instructions may cause the machine to perform asynchronous scanning using redirected scanners with a single driver. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent client device 110 or server 140 of FIGS. 1-3.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein. In one embodiment, processing logic 726 is representative of toolbox 112. In another embodiment, processing logic 726 is representative of toolbox service engine 142.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of toolbox 112 or toolbox service engine 142) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "maintaining", "receiving", "determining", "causing,"

"presenting," "sending," "executing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   presenting, by a processing device of a client device, a user interface by a toolbox application executing on the client device;
   receiving a natural language search query identifying a desired functionality to be performed for a user of the client device, wherein the natural language search query is provided by the user of the client device via the user interface of the toolbox application;
   determining, by the processing device, whether any of a plurality of utility components accessible to the toolbox application on the client device for execution performs the desired functionality specified in the natural language search query, wherein the plurality of utility components accessible to the toolbox application on the client device for execution comprise utility components previously provided to the toolbox application by a server device in response to prior natural language search queries of the user; and
   responsive to determining that none of the plurality of utility components accessible to the toolbox application on the client device performs the desired functionality specified in the natural language search query, sending a request comprising the natural language search query to the server device to cause the server device to provide, to the toolbox application, a utility component that performs the desired functionality specified in the natural language search query.

2. The method of claim 1, further comprising:
   responsive to determining that a first utility component of the plurality of utility components accessible to the toolbox application performs the desired functionality, executing the first utility component to perform the desired functionality.

3. The method of claim 1, further comprising:
   parsing the natural language search string query to determine a keyword for the desired functionality specified in the request;
   accessing a knowledge base on the client device that stores associations between keywords and utility components accessible to the toolbox application; and
   comparing the keyword from the request to the keywords in the knowledge base data store.

4. The method of claim 1, further comprising:
   receiving resource location information from the server device for a second utility component to facilitate downloading of the second utility component by the toolbox application on the client device, wherein the second utility component performs the desired functionality;
   downloading the second utility component using the resource location information; and
   storing the second utility component on the client device so that the second utility component is accessible by the toolbox application.

5. The method of claim 1, further comprising:
   receiving resource location information from the server device for a second utility component to facilitate remote execution of the second utility component by the toolbox application on the client device, wherein the second utility component performs the desired functionality; and
   storing the resource location information for the second utility component so that the second utility component is accessible by the toolbox application.

6. The method of claim 1, further comprising:
   receiving a second natural language search query identifying a first desired functionality and a second desired functionality;
   determining a list of utility components that perform the first desired functionality and the second desired functionality;
   selecting, from the list of utility components, a third utility component that performs the first desired functionality;
   selecting, from the list of utility components, a fourth utility component that performs the second desired functionality; and
   generating a combined utility component, wherein the combined utility component associates the third utility component with the fourth utility component.

7. The method of claim 2, further comprising:
   associating the first utility component with an input action received via the user interface of the toolbox application;
   detecting the input action received via the user interface of the toolbox application; and
   initiating execution of the first utility component based on the detected input action.

8. The method of claim 7, wherein the input action is at least one of a toggle on action, a toggle off action, a push button action, or a drag and drop action.

9. The method of claim 7, further comprising:
receiving a new utility component that performs a new desired functionality, the new utility component generated by the user of the client device; and
sending the new utility component to the server device to be associated with the new desired functionality in a library of utility components on the server device.

10. A server computing system comprising:
a memory; and
a processing device operatively coupled to the memory, the processing device to:
maintain a library of a plurality of utility components, wherein each utility component of the plurality of utility components performs one or more functionalities;
receive a request from a toolbox application on a client device, wherein the request comprises a natural language search query identifying a desired functionality, wherein the search query is provided by a user of the client device via a user interface of the toolbox application, wherein the request indicates that none of utility components accessible to the toolbox application on the client device for execution performs the desired functionality, and wherein the utility components accessible to the toolbox application on the client device for execution comprise utility components previously provided to the toolbox application by the server computing system in response to prior natural language search queries of the user;
determine whether any of the plurality of utility components maintained in the library performs the desired functionality specified in the request;
responsive to determining that a first utility component of the plurality of utility components performs the desired functionality specified in the request, cause the first utility component to be accessible to the toolbox application on the client device for execution; and
responsive to determining that none of the plurality of utility components performs the desired functionality specified in the request, generating a utility component that performs the desired functionality to be provided to the toolbox application on the client device.

11. The server computing system of claim 10, wherein the processing device is further to:
parse the natural language search query to determine a keyword for the desired functionality specified in the request;
access a knowledge base data store that stores associations between keywords and utility components; and
compare the keyword from the request to the keywords in the knowledge base data store.

12. The server computing system of claim 11, wherein to parse the natural language search query, the processing device is to perform linguistic analysis on the natural language search query.

13. The server computing system of claim 10, wherein the desired functionality is not available in any utility component of the client device.

14. The server computing system of claim 10, wherein to cause the first utility component to be accessible to the toolbox application for execution, the processing device is to send resource location information for the first utility component to facilitate downloading the first utility component by the toolbox application on the client device.

15. The server computing system of claim 10, wherein to cause the first utility component to be accessible to the toolbox application for execution, the processing device is to send resource location information for the first utility component to facilitate remote execution of the first utility component by the toolbox application on the client device.

16. The server computing system of claim 15, wherein the processing device is further to:
receive a request from the toolbox application on the client device to execute the first utility component;
execute the first utility component on behalf of the toolbox application on the client device; and
return a response to the toolbox application on the client device.

17. The server computing system of claim 10, wherein the processing device is further to:
responsive to determining that none of the plurality of utility components performs the functionality specified in the request,
prompt the toolbox application on the client device for a first functional requirement for the desired functionality specified in the request,
receive the first functional requirement for the desired functionality from the toolbox application on the client device, and
store an association between the first functional requirement and the desired functionality.

18. The server computing system of claim 17, wherein the processing device is further to:
receive a list of users associated with the server device; and
send a request to the list of users for a new utility component, the request comprising the first functional requirement for the desired functionality.

19. The server computing system of claim 17, wherein the processing device is further to:
receive a second functional requirement for the desired functionality;
determine that a first utility component performs the first functional requirement;
determine that a second utility component performs the second functional requirement;
associating the first utility component with the second utility component to generate a combined utility component; and
causing the combined utility component to be accessible to the toolbox application for execution.

20. A non-transitory computer readable storage medium storing instructions that, when executed by a processing device of a client device, cause the processing device to:
present a user interface by a toolbox application executing on the client device;
receive a natural language search query identifying a desired functionality to be performed for a user of the client device, wherein the search query is provided by the user of the client device via the user interface of the toolbox application;
determine, by the processing device, whether any of a plurality of utility components accessible to the toolbox application on the client device for execution performs the desired functionality specified in the natural language search query, wherein the plurality of utility components accessible to the toolbox application on the client device for execution comprise utility components previously provided to the toolbox application by a server device in response to prior natural language search queries of the user; and responsive to determining that none of the plurality of utility components accessible to the toolbox application on the client device performs the desired functionality specified in the natural language search query, sending a request comprising the natural language search query to the server device to cause the server device to provide, to the toolbox application, a utility component that performs the desired functionality specified in the natural language search query.

21. The non-transitory computer readable storage medium of claim 20, wherein the instructions further cause the processing device to:

responsive to determining that a first utility component of the plurality of utility components accessible to the toolbox application performs the desired functionality, execute the first utility component to perform the desired functionality.

22. The non-transitory computer readable storage medium of claim 20, wherein the instructions further cause the processing device to:

parse the natural language search string query to determine a keyword for the desired functionality specified in the request;

access a knowledge base on the client device that stores associations between keywords and utility components accessible to the toolbox application; and compare the keyword from the request to the keywords in the knowledge base data store.

23. The non-transitory computer readable storage medium of claim 20, wherein the instructions further cause the processing device to:

receive resource location information from the server device for a second utility component to facilitate downloading of the second utility component by the toolbox application on the client device, wherein the second utility component performs the desired functionality;

download the second utility component using the resource location information; and store the second utility component on the client device so that the second utility component is accessible by the toolbox application.

24. The non-transitory computer readable storage medium of claim 20, wherein the instructions further cause the processing device to:

receive resource location information from the server device for a second utility component to facilitate remote execution of the second utility component by the toolbox application on the client device, wherein the second utility component performs the desired functionality; and store the resource location information for the second utility component so that the second utility component is accessible by the toolbox application.

25. The non-transitory computer readable storage medium of claim 20, wherein the instructions further cause the processing device to:

receive a second natural language search query identifying a first desired functionality and a second desired functionality;

determine a list of utility components that perform the first desired functionality and the second desired functionality;

select, from the list of utility components, a third utility component that performs the first desired functionality;

select, from the list of utility components, a fourth utility component that performs the second desired functionality; and generate a combined utility component, wherein the combined utility component associates the third utility component with the fourth utility component.

26. The non-transitory computer readable storage medium of claim 21, wherein the instructions further cause the processing device to:

associate the first utility component with an input action received via the user interface of the toolbox application;

detect the input action received via the user interface of the toolbox application; and initiate execution of the first utility component based on the detected input action.

27. The non-transitory computer readable storage medium of claim 26, wherein the input action is at least one of a toggle on action, a toggle off action, a push button action, or a drag and drop action.

28. The non-transitory computer readable storage medium of claim 26, wherein the instructions further cause the processing device to:

receiving a new utility component that performs a new desired functionality, the new utility component generated by the user of the client device; and sending the new utility component to the server device to be associated with the new desired functionality in a library of utility components on the server device.

* * * * *